J. DICK.
FODDER CUTTER.
APPLICATION FILED JULY 17, 1912.
1,072,924.
Patented Sept. 9, 1913.
6 SHEETS—SHEET 1.
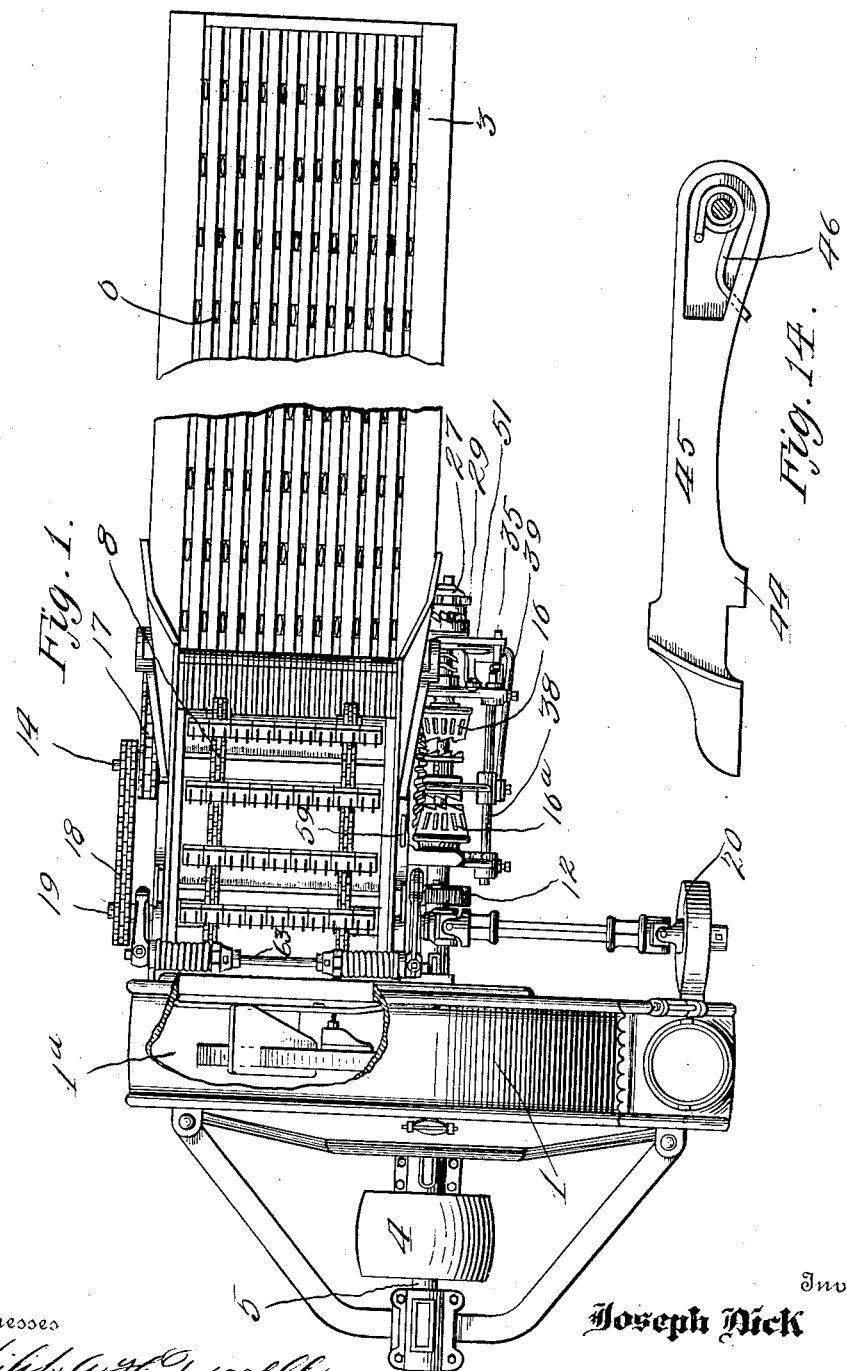
Witnesses
Philip A. H. Terrell
Ruth A. Miller
Inventor
Joseph Dick
By Harry Frease
Attorney

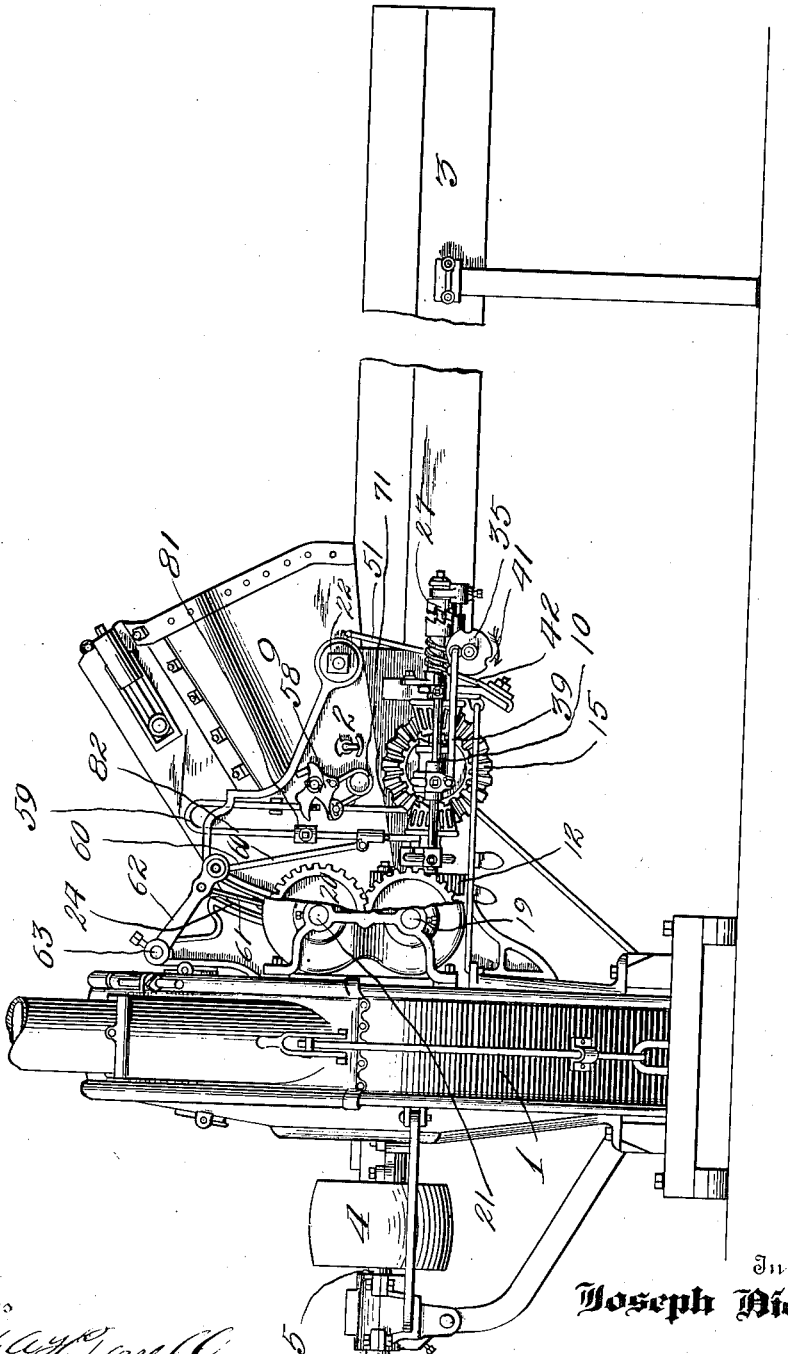

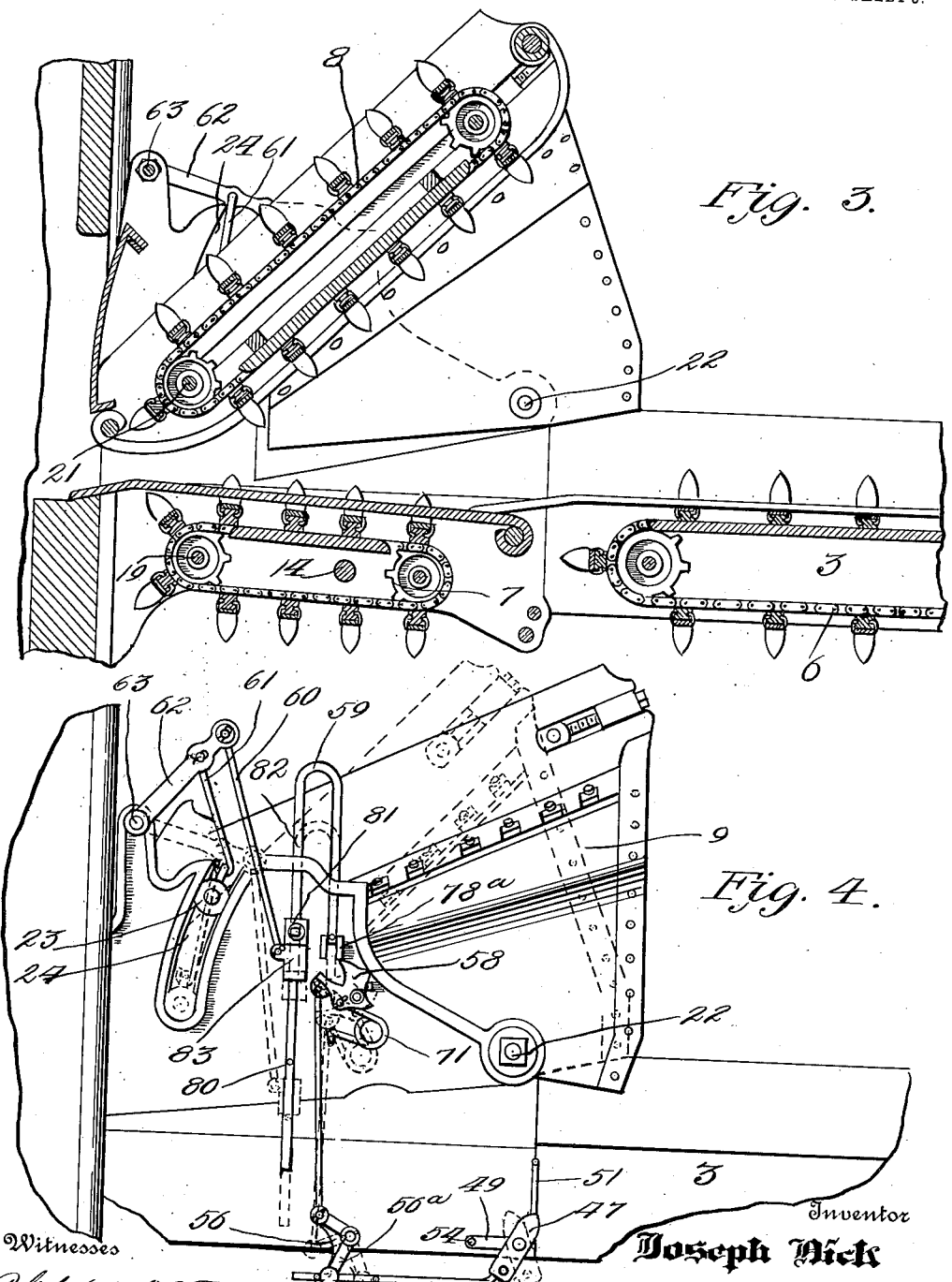

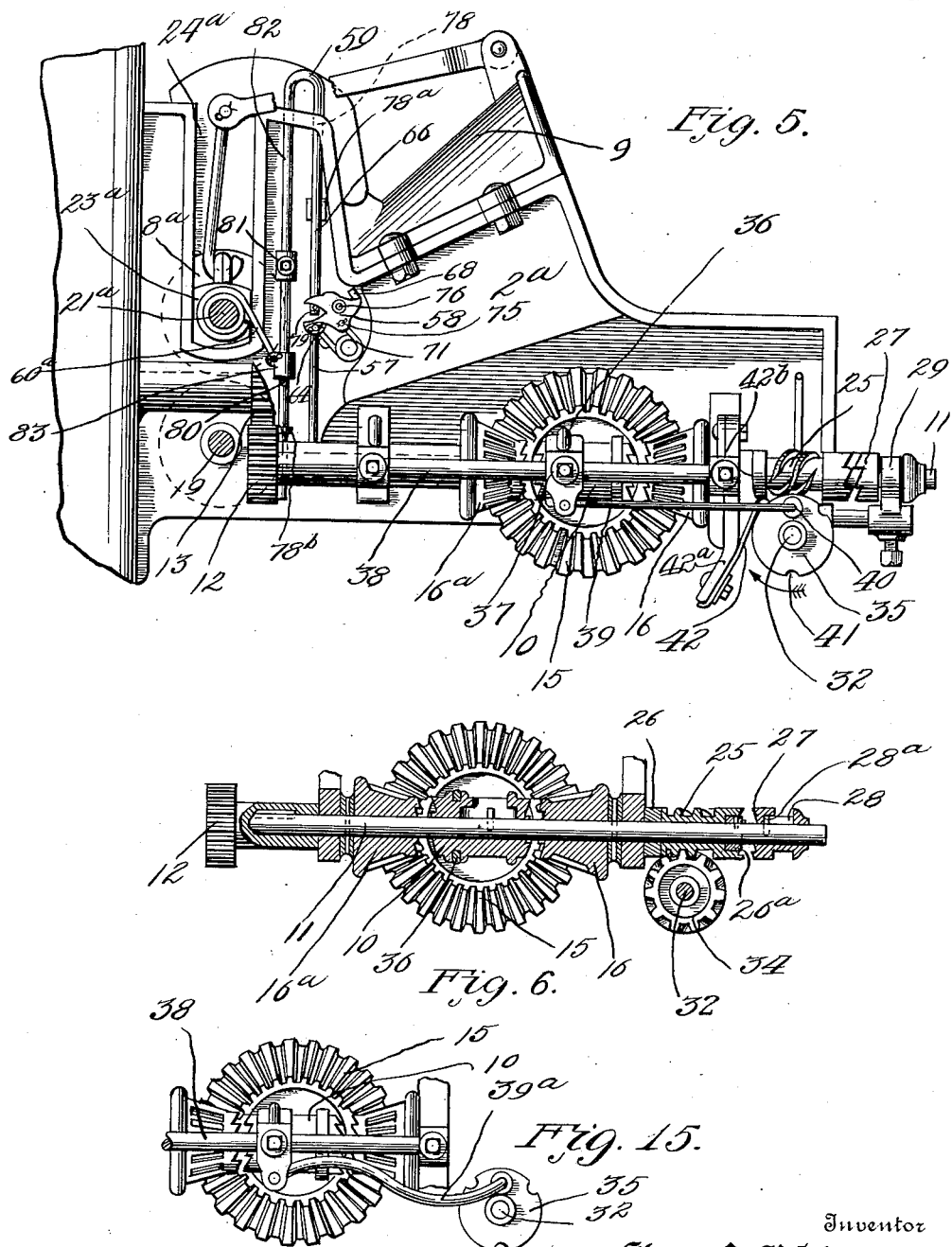

J. DICK.
FODDER CUTTER.
APPLICATION FILED JULY 17, 1912.
1,072,924.
Patented Sept. 9, 1913.
6 SHEETS—SHEET 5.
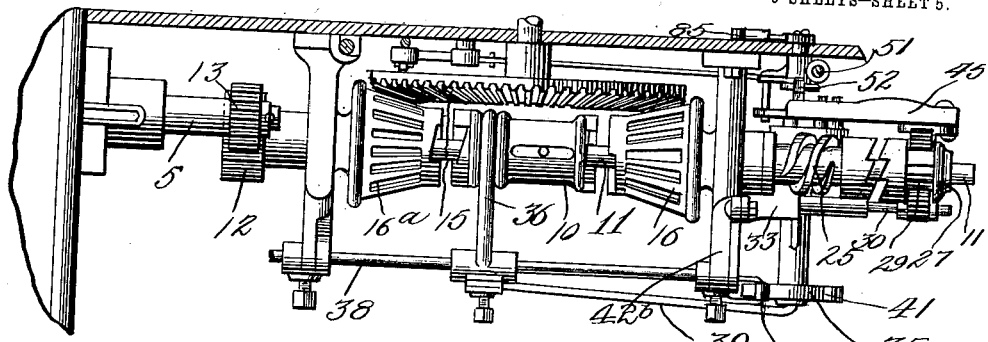
Fig. 7.
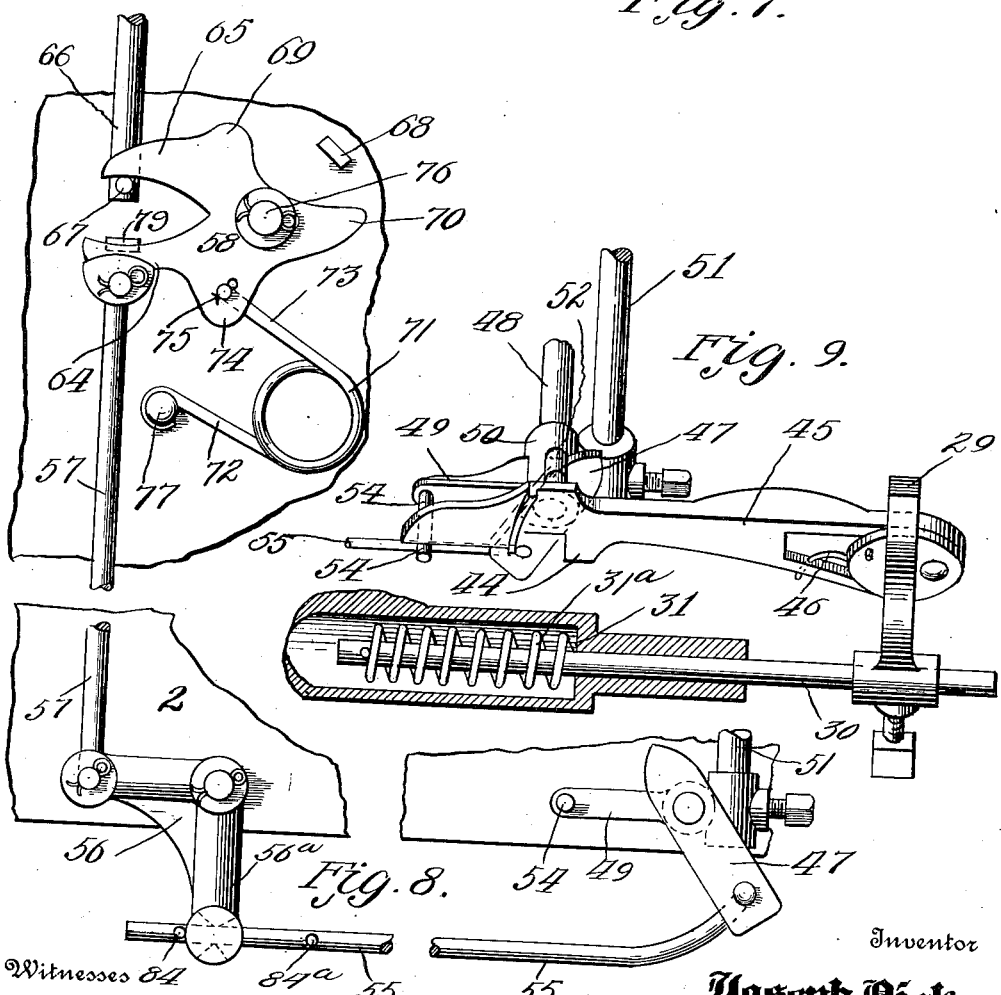
Fig. 9.
Fig. 8.
Witnesses
Philip A. Farrell
Ruth A. Miller
Inventor
Joseph Dick
By Harry Frease
Attorney

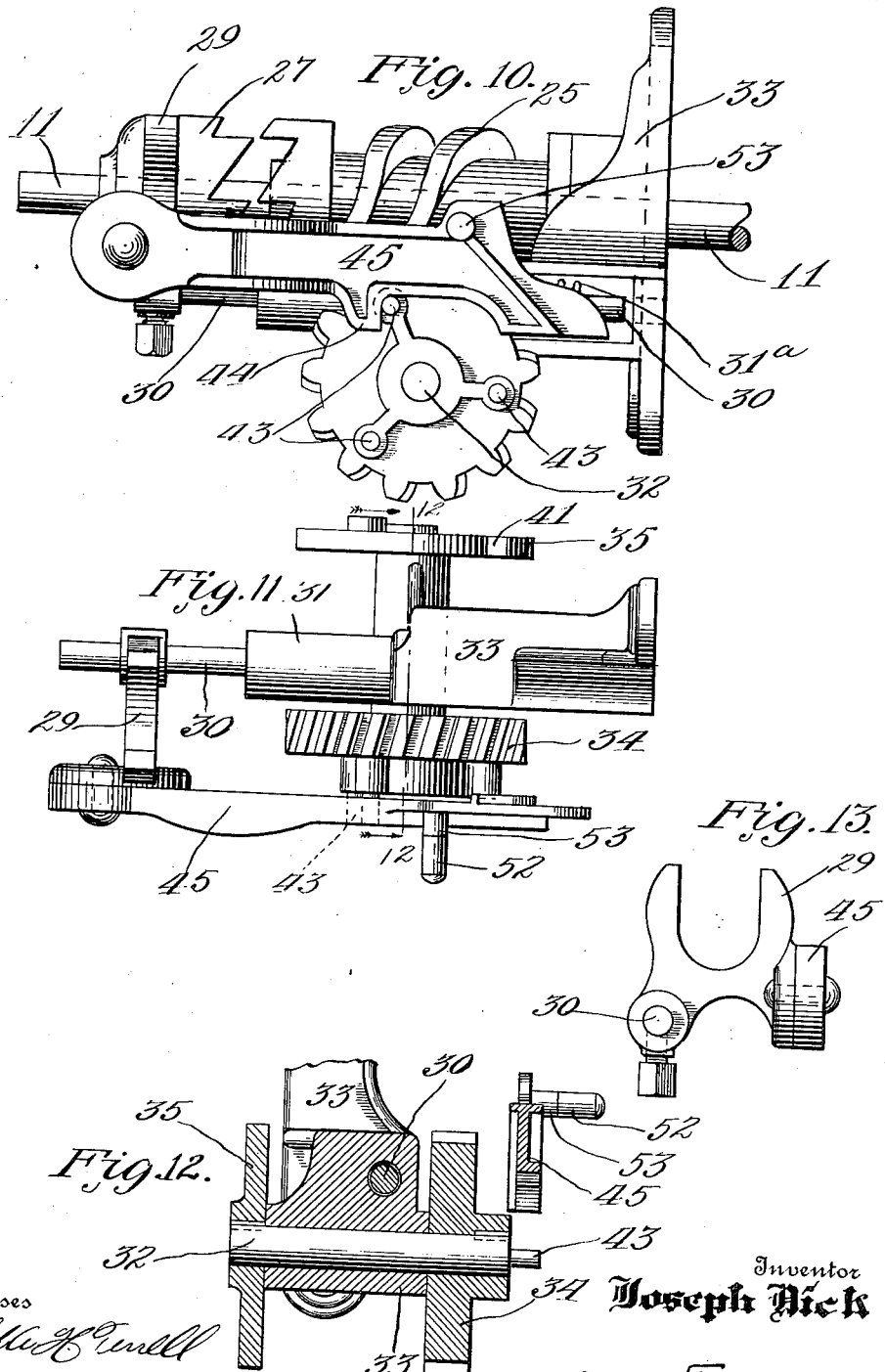

UNITED STATES PATENT OFFICE.

JOSEPH DICK, OF CANTON, OHIO.

FODDER-CUTTER.

1,072,924. Specification of Letters Patent. Patented Sept. 9, 1913.

Application filed July 17, 1912. Serial No. 709,975.

*To all whom it may concern:*

Be it known that I, JOSEPH DICK, a citizen of the United States, residing at Canton, in the county of Stark and State of Ohio, have invented certain new and useful Improvements in Fodder-Cutters, of which the following is a specification.

The invention relates to a controlling gearing for the feed mechanism in machines for cutting fodder and other forage, and especially in machines for cutting alfalfa and similar plants having long limber stems or stalks which are inclined to become tangled and bunched together; and the principal object of the invention is to provide a controlling mechanism which will automatically reverse the feed mechanism of the machine when the forage becomes bunched and choked in the throat of the feed hopper to such an extent as will impede or prevent a proper operation of the machine, thereby ejecting from the throat of the machine the forage which has lodged therein.

Further objects of the invention involve the reversing and stopping of the feed mechanism, either automatically or by manual means, and the subsequent starting of the feed mechanism by manual means, without at any time stopping the cutting and blowing mechanism.

A preferred embodiment of the invention, thus set forth in general terms, is illustrated in the accompanying drawings, forming part hereof, in which—

Figure 1 is a plan view of the fodder cutter, showing the general arrangement of the several gearings; Fig. 2, a side elevation of the same; Fig. 3, a fragmentary longitudinal section of the preferred form of feed hopper, showing the general arrangement of the feed conveyers; Fig. 4, a fragmentary side elevation of the same, showing the top of the hopper oscillated upward and omitting the transmission and controlling gearings; Fig. 5, a fragmentary side elevation, showing a modified form of feed hopper, and showing the transmission and controlling gearings thereon; Fig. 6, a longitudinal section on the line of the longitudinal countershaft, showing the reversible and releasable transmission gearing and the controlling gearing thereon; Fig. 7, a plan view of the transmission and controlling gearings; Fig. 8, a fragmentary side elevation of the trip mechanism, showing the cam crank, bell crank and trip fingers; Fig. 9, a fragmentary perspective view of the controlling clutch yoke, the lock lever and the trip fingers; Fig. 10, an inner side elevation of the controlling gearing; Fig. 11, a plan view of the same, omitting the longitudinal countershaft and worm sleeve and controlling clutch thereon; Fig. 12, a fragmentary section on line 12—12, Fig. 11; Fig. 13, an end view of the controlling clutch yoke; Fig. 14, a detached side elevation of the releasing lever; and Fig. 15, a side view showing a modified yielding pitman.

Similar numerals refer to similar parts throughout the drawings.

The fodder cutter includes the case 1 for the cutting and blowing mechanism 1ª, the feed hopper 2 or 2ª, and the feed trough 3; and power is preferably transmitted to the machine by means of a belt operating on the pulley 4 secured on the main shaft 5 of the cutting and blowing mechanism on the rear side of the case.

The feed mechanism includes the conveyer 6 in the bottom of the feed trough, the lower conveyer 7 in the bottom of the feed hopper, and the oscillating conveyer 8 in the top of the feed hopper, as shown in Figs. 1, 2, 3 and 4, or the oscillating feed roll 8ª when the top or cover 9 of the feed hopper is relatively fixed, as shown in the modified form of machine in Fig. 5; which oscillating conveyer or oscillating feed roll is normally located in the path of the fodder carried on the lower conveyer, and is therefore adapted to be oscillated thereby.

Power is transmitted from the main shaft 5 to the feed mechanism by means of the double clutch 10 feathered or splined on the countershaft 11 longitudinally mounted on one side of the feed hopper, on the rear end of which countershaft is secured the gear wheel 12 which meshes with the gear wheel 13 secured on the forward end of the main shaft 5, so that the longitudinal countershaft 11 and the double clutch 10 rotate continuously when the cutting and blowing mechanism is in operation.

The transverse countershaft 14 is rotatably mounted in the bottom of the feed hopper and on one end of this shaft is secured the bevel master gear wheel 15 adjacent to the longitudinal shaft 11, on which shaft are rotatably mounted the bevel pinions 16 and 16ª, one adjacent to each end of the double clutch, which bevel pinions mesh with the master gear wheel on diametrically opposite sides thereof. The bevel pinions 16 and 16ª are spaced apart so that the double clutch can rotate either freely between them, or, by a shifting to or fro on the shaft, will engage either one pinion or the other for operating the feed mechanism in either a forward or reverse direction; thus forming a releasable and reversible transmission gearing between the cutting and blowing mechanism and the feed mechanism.

The feed trough conveyer 6 is operated from the transverse countershaft 14 by the gear chain 17, and the conveyer 7 in the bottom of the feed hopper is operated from the same countershaft by the gear chain 18. Power is transmitted from the shaft 19 of the hopper-bottom conveyer 7 by means of the gearing 20, to the shaft 21 of the oscillating conveyer 8 in the top of the feed hopper, or the shaft 21ª of the oscillating feed roll 8ª, as the case may be. The gearings are so arranged that these conveyers will be operated forward for feeding the machine when the double clutch 10 is engaged with the bevel pinion 16, or will be operated in the reverse direction when the double clutch 10 is engaged with the bevel pinion 16ª, or will be released when the clutch 10 is disengaged from both of the bevel pinions 16 and 16ª, as shown in the several figures.

When the oscillating conveyer 8 is used in the top of the feed hopper, it is preferably mounted on the pivots 22, and the bearings 23 for the shaft 21 in the end of this conveyer are mounted to oscillate upward and downward in the guide slots 24 in the sides of the feed hopper 2, which slots are curved concentric with the pivots 22; and, when the top or cover 9 of the feed hopper 2ª is relatively fixed, the bearings 23ª for the shaft 21ª of the oscillating feed roll 8ª are arranged to operate upward and downward in the guide slots 24ª formed in the sides of the feed hopper 2ª, as shown in Fig. 5.

The controlling gearing is composed of the normally idle worm sleeve 25 rotatably mounted on the longitudinal countershaft 11 and retained against longitudinal movement on the shaft by the collars 26 and 26ª; the clutch 27 which is feathered or splined by the slot 28 and pin 28ª on the longitudinal countershaft 11 adjacent to one end of the worm sleeve 25, which clutch is moved into and out of engagement with the worm sleeve 25 by means of the clutch yoke 29 secured on the end of the sliding bar 30 which is movable endwise in the tubular guide socket 31 wherein is provided the compression spring 31ª acting to shift the clutch into engagement with the worm sleeve; and the transverse crank shaft 32 which is journaled in the bracket 33 which carries the tubular guide 31, on which shaft is mounted the worm wheel 34 on the inner side of the bracket, and the disk-crank 35 on the outer side thereof.

The double clutch 10 is shifted to and fro along the longitudinal countershaft 11 by means of the clutch yoke 36 formed or secured on the pitman head 37 which is slidably mounted on the guide rod 38 located parallel with and adjacent to the outer side of the longitudinal countershaft 11, which pitman head is connected with the disk-crank 35 by means of the pitman 39; and the parts are so arranged that when the wrist pin 40 is located directly above the crank shaft, the clutch 10 is held midway between the bevel pinions 16 and 16ª, thus releasing the feed mechanism; while a rotation of the disk-crank 35 about one-third of a complete turn in the direction of the arrow shown in Figs. 2 and 5, (which is the direction it is turned by the worm gear when the same is rotating with the longitudinal countershaft 11,) will move the double clutch 10 into engagement with the bevel pinion 16 for driving the feed mechanism in direction to feed the machine, and a further rotation of the disk-crank in the same direction about another third of a full turn, will shift the double clutch 10 into engagement with the bevel pinion 16ª, thereby rotating the feed mechanism in reverse direction.

The disk-crank 35 is provided with the peripheral notches 41 in one of which the spring detent 42 secured to the pendent arm 42ª of the bearing bracket 42ᵇ is adapted to engage when the wrist pin is in each of the respective positions, thus described, for either releasing or operating the feed mechanism in one direction or the other; and the worm wheel 34 is provided with the three laterally-projecting release-pins 43 which are arranged to successively impinge the lug 44 which depends from the lower side of the release-lever 45 which is pivoted on the inner side of the controlling clutch-yoke 29, and thereby shift the controlling clutch out of engagement with the worm sleeve, thus releasing the controlling gearing; and the parts are so proportioned and arranged that the controlling gearing will be thus released when the wrist pin is in each one of the several positions described for either releasing, or for driving the feed mechanism in opposite directions, and the spring detent is engaged in the corresponding notch.

The release lever 45 is normally held downward by the spring 46 to keep the lug 44 in the path of the release pins 43, and is tripped either automatically by the finger 47 which is pivoted on the end of the rock shaft 48 mounted on the side of the hopper 2, or manually by the finger 49 formed on the hub 50 mounted on the same shaft 48, and is provided with the handle 51. In the first case, the free end of the trip finger 47 operates in either direction against the roller 52 which is mounted on the pin 53 projecting from the inner side of the release lever, and, in the latter case, the pin 54 which protrudes from the side of the manual trip finger 49 operates under the free end of the lock lever; it being understood that either one of the trip fingers is adapted to be operated without the other.

The automatic trip finger 47 is operated by means of the connecting rod 55, the bell crank 56, the connecting link 57, the cam crank 58, the slide yoke 59 and the pitman 60 or 60ª; which pitman 60 in one case is operatively connected with one bearing 23 of the shaft 21 of the oscillating conveyer 8 by means of the connecting link 61 and the lever 62 on the rock shaft 63, as shown in Figs. 2 and 4, while in the other case the pitman 60ª is operatively connected directly with the bearing 23ª of the shaft 21ª of the oscillating feed roller, as shown in Fig. 5. The pendent arm 56ª of the bell crank is slidably connected with the rod 55 between the spaced stops 84 and 84ª thereon for properly timing the tripping of the release lever and compensating for the peculiar operation of the cam crank 58.

The cam crank 58 is in the nature of a bell crank having its two arms 64 and 65 diverging as jaws to form a cusp-like mouth between them, the connecting bar 57 being pivoted to the lower jaw and the free end of the leg 66 of the slide yoke 59 having a pin 67 thereon adapted to operate in the opening between the jaws to rotate the jaws upward by cam contact with the upper jaw, or downward by a cam contact with the lower jaw. A lug 68 is provided on the side of the hopper against which the upward movement of the jaws is positively stopped by the nose 69 of the upper jaw, and the downward movement of the jaws is positively stopped by the abutment of the tail 70 of the cam crank; and the coiled spring 71 is provided, having one arm 72 pivoted to the hopper and the other arm 73 pivoted to the pendent ear 74 on the cam crank, which spring serves to positively throw and hold the crank in one stopped position or the other by the passing of the spring-crank pivot 75 to and fro across the neutral line between the crank-hopper pivot 76 and the spring-hopper pivot 77.

The slide yoke 59 is operatively mounted in suitable guides as 78, 78ª and 78ᵇ on the side of the hopper, and the free end of the leg 66 normally rests on the stop lug 79 provided on the side of the hopper. The stop pin 80 and the stop collar 81 are spaced apart on the other leg 82 of the slide yoke 59 between which pin and collar the pitman head 83 of the pitman 60 or 60ª is adapted to operate, the lower end of the pitman head impinging the stop pin when the oscillating conveyer or feed roll drops downward, as shown in Figs. 2 and 5, and the upper end of the pitman head impinging the stop collar 81 when the oscillating conveyer or feed roll is thrown upward, as shown in Fig. 4. The stop collar 81 is adjustable up and down upon the leg 82 of the slide yoke, thereby varying the distance which the oscillating conveyer or feed roll may be thrown upward before the collar is impinged by the pitman head 83.

The parts are so proportioned and arranged that, when the oscillating conveyer 8 or feed roll 8ª are thrown upward far enough to cause the pitman head 83 to impinge the stop collar 81 and thereby throw the slide yoke 59 upward, the cam pin 67 on the lower end of the leg 66 thereof operating against the upper jaw of the cam crank 58 will rotate the same upward, and just before the pin clears the point of the jaw the spring-crank pivot 75 crosses the neutral line, as shown in Fig. 8, whereupon the spring 71 positively rotates the cam crank until its nose 69 is stopped against the lug 68; in which relation of the parts the upper jaw 65 has entirely cleared the path of the cam pin 67, and the mouth between the crank jaws is directed upward to freely receive the return movement of the same, as shown in Fig. 4. It will be understood that, while the cam crank is held in this position by the action of the spring 71, the slide yoke is free to be thrown on upward by a further raising of the oscillating conveyer or feed roll. During this operation, and substantially coincident with the passing of the spring-crank pivot 75 beyond the neutral line, the pendent arm 56ª of the bell crank 56 impinges the stop 84 on the connecting bar 55; and the final rotation of the cam-crank by the cam spring shifts the connecting bar 55 endwise and rotates the point of the finger 47 and thereby trips the release lever 45 and disengages its lug 44 from the release pin 43 on the side of the worm wheel 34. In this operation, the point of the trip finger 47 passes under and beyond the roller 52 on the pin 53, so that the release lever is free to drop downward again to bring its pendent lug in the path of the release pins 43, and the trip finger 47 is in position to trip the lever again by a return or reverse rotation. And, when the oscillating conveyer or feed roll drops downward again to its normal or initial position, the pitman head 83 impinges the stop pin 80 on the leg 82 of the slide yoke, and carries the same downward so that the cam pin 67 on the leg 66 thereof enters the mouth of the cam-crank and impinges the lower jaw 64 thereof and carries the same downward until the spring-crank pivot 75 re-crosses the neutral line, whereupon the cam spring 71 positively rotates the cam-crank downward until its tail is stopped against the lug 68, which operation brings the upper jaw 65 downward against the cam pin 67 in normal position for another upward operation. As before, during this operation and substantially coincident with the passing of the spring-crank pivot 75 beyond the neutral line, the pendent arm 56ª of the bell crank 56 impinges the stop 84ª on the connecting bar 55, and the final rotation of the cam crank by the cam spring shifts the connecting bar 55 endwise and rotates the point of the finger 47 reversely and thereby again trips the release lever 45 and disengages its lug 44 from the release pin 43 on the side of the worm wheel 34. It is thus evident that the release lever is automatically tripped by the finger 47 whenever the oscillating conveyer 8 or feed roll 8ª is thrown upward beyond a certain point, determined by the adjustment of the stop collar 81; and that the release lever is again automatically tripped by the same finger when the oscillating conveyer or feed roll drops downward again into its normal position: and it is furthermore evident that the oscillating conveyer or feed roll may be freely thrown upward beyond the determined point for tripping the release lever, so that no damage to the mechanism can occur while the controlling mechanism is operating to reverse the feed mechanism; which excessive or independent upward movement of the oscillating conveyer or feed roll is permitted because of the peculiar construction and operation of the cam crank and the play of the bell crank between the spaced stops on the connecting rod 55.

When the feed mechanism is not in operation, and there is no fodder in the feed hopper, the oscillating conveyer or the upper feed roll drop downward by the mere weight of the respective parts into the normal position shown in Figs. 2 and 5; in which relation of the parts the double clutch sleeve 10 is disengaged from both of the bevel pinions 16 and 16ª and the feed mechanism is released when the wrist pin of the disk-crank 35 is located directly upward from the crank shaft, as shown in Figs. 2 and 5,— the controlling clutch 27 being released from the worm sleeve 25 by action of the corresponding release pin 43 on the worm wheel 34 on the depending lug of the release lever 45 and detention of the spring detent 42.

To operate the machine for feeding and cutting fodder, the cutting mechanism and the longitudinal countershaft 10 with the controlling clutch 27 thereon being in motion, the release lever is tripped by the finger 49 which is manually operated by the handle 51, thus disengaging the release pin 43 from the depending lug of the release lever, and permitting the energy of the spring 31ª to move the slide rod 30 and clutch yoke 29 to carry the controlling clutch 27 into engagement with the worm sleeve 25, the rotation of which with the countershaft 10 operates the controlling gearing and causes the disk-crank 35 thereof to rotate in the direction shown by the arrow in Figs. 2 and 5, which carries the double clutch 10 into engagement with the bevel pinion 16 and operates the feed mechanism in forward direction for feeding the machine. During this operation of the controlling gearing, the next one of the release pins 43 on the worm wheel 34 rotates into the path of and impinges the lug 44 depending from the release lever 45, which is normally depressed by action of the spring 46, the handle 51 of the trip finger 49 having been released by the operator and returned to normal position by action of the spring 85; and a further rotation of the release pin carries the release lever, the clutch yoke and with it the controlling clutch 27, far enough to disengage the clutch from the worm sleeve 25, so that the operation of the controlling gearing will stop when the double clutch 10 is in engagement with the bevel pinion 16; and a reverse rotation of the controlling gearing is prevented by the engagement of the spring detent 42 in the corresponding notch 41 of the disk-crank. The forward operation of the mechanism for feeding the machine, thus described, will continue until the release lever is again tripped, either manually by the handle 51 or automatically by the raising of the oscillating conveyer 8 or the upper feed roll 8ª, as, for instance, when the throat of the feed hopper becomes unduly clogged or choked by the bunching of an excessive amount of fodder therein; whereupon the tripping of the release lever permits the controlling clutch to again engage the worm sleeve, which rotates the crank shaft and thereby the disk-crank until the double clutch 10 is shifted into engagement with the bevel pinion 16ª which reverses the operation of the feed mechanism and promptly ejects the contents from its throat and carries the same backward along the lower conveyer of the feed hopper and also the conveyer in the feed trough; which result is accomplished almost instantaneously, thus permitting the oscillating conveyer or the upper feed roll to drop downward into normal position, which dropping again trips the release lever and brings the controlling gearing into operation for releasing the double clutch from the bevel pinion 16ª and stops the feed mechanism; all of which is accomplished automatically and without stopping the cutting and blowing mechanism; after which the feed mechanism may be again started forward normally by a further manipulation of the trip handle, as described above.

For the purpose of avoiding injury to the mechanism by a failure of the double clutch 10 to properly engage with the bevel pinion 16 or 16ª, a yielding pitman 39ª, as shown in Fig. 15, may be employed, the same being sufficiently curved to permit a reasonable amount of endwise compression or extension, at the same time being strong enough to perform its normal function as a connecting rod.

I claim:

1. In a fodder cutter, the combination of a cutting mechanism, a feed mechanism having an oscillating element, an intervening reversible and releasable transmission gearing, a controlling gearing for reversing the transmission gearing, and a trip mechanism for the controlling gearing actuated by the oscillating element at a predetermined point in its oscillation.

2. In a fodder cutter, the combination of a cutting mechanism, a feed mechanism having an oscillating element, an intervening reversible and releasable transmission gearing, a controlling gearing for reversing and releasing the transmission gearing, and a trip mechanism for the controlling gearing actuated by the oscillating element at predetermined points in its oscillation.

3. In a fodder cutter, the combination of a cutting mechanism, a feed mechanism, an intervening transmission gearing, a controlling gearing for the transmission gearing including a crank operatively connected with the transmission gearing and having a normally-idle gear connection with the cutting mechanism, a spring clutch operatively connected with the cutting mechanism for engaging the idle gear, means actuated by the idle gear for releasing the clutch, an oscillating element in the path of the fodder, and means actuated by the oscillating element for tripping the releasing means.

4. In a fodder cutter, the combination of a cutting mechanism, a feed mechanism, an intervening transmission gearing, a controlling gearing for the transmission gearing including a crank having a pitman connection with the transmission gearing and a normally-idle gear connection with the cutting mechanism, a spring clutch operatively connected with the cutting mechanism for engaging the idle gear, means actuated by the idle gear for releasing the clutch, an oscillating element in the path of the fodder, and means actuated by the oscillating element for tripping the releasing means.

5. In a fodder cutter, the combination of a cutting mechanism, a feed mechanism, an intervening transmission gearing, and a controlling gearing having a yielding pitman connection with the transmission gearing.

6. In a fodder cutter, the combination of a cutting mechanism, a feed mechanism, an intervening transmission gearing, a controlling gearing for the transmission gearing including a notched disk-crank, operatively connected with the transmission gearing and having a normally-idle gear connection with the cutting mechanism, a spring clutch operatively connected with the cutting mechanism for engaging the idle gear, means actuated by the idle gear for releasing the clutch, and a spring detent engaging the disk-crank notches for holding the idle gear released.

7. In a fodder cutter, the combination of a cutting mechanism, a feed mechanism, an intervening transmission gearing, a controlling gearing for the transmission gearing including a crank operatively connected with the transmission gearing and having a normally-idle gear connection with the cutting mechanism, a spring clutch operatively connected with the cutting mechanism for engaging the idle gear, means actuated by the idle gear for releasing the clutch, an oscillating element in the path of the fodder, and means actuated by the oscillating element for tripping the releasing means, with manual means for operating the releasing means.

8. In a fodder cutter, the combination of a cutting mechanism, a feed mechanism, an intervening transmission gearing, a controlling gearing for the transmission gearing, and a trip mechanism for the controlling gearing including a trip device, a cam crank having radial jaws forming an intervening mouth, a spring acting to alternately rotate the cam crank in opposite directions from a neutral line, an oscillating element in the path of the fodder, and a pin operatively connected with the oscillating element adapted to operate in the mouth to alternately impinge the respective jaws.

9. In a fodder cutter, the combination of a cutting mechanism, a feed mechanism, an intervening transmission gearing, a controlling gearing for the transmission gearing, and a trip mechanism for the controlling gearing including a trip device, a cam crank having radial jaws forming an intervening mouth, a spring acting to alternately rotate the cam crank in opposite directions from a neutral line, an oscillating element in the path of the fodder, a pin operatively connected with the oscillating element adapted to operate in the mouth to alternately impinge the respective jaws, and operative connections between the cam crank and the trip device.

10. In a fodder cutter, the combination of a cutting mechanism, a feed mechanism, an intervening transmission gearing, a controlling gearing for the transmission gearing, and a trip mechanism for the controlling gearing including a trip device, a cam crank having radial jaws forming an intervening mouth, a spring acting to alternately rotate the cam crank in opposite directions from a neutral line, an oscillating element in the path of the fodder, and a pin operatively connected with the oscillating element adapted to operate in the mouth to alternately impinge the respective jaws, and operative connections between the cam crank and the trip device, said connections having a spaced-stop extensibility.

11. In a fodder cutter, the combination of a cutting mechanism, a feed mechanism, an intervening transmission gearing, a controlling gearing for the transmission gearing, and a trip mechanism for the controlling gearing including a trip device, a cam crank having radial jaws forming an intervening mouth, a spring acting to alternately rotate the cam crank in opposite directions from a neutral line, a slide element having a pin adapted to operate in the mouth and to alternately impinge the respective jaws, one of the jaws being operatively connected with the trip device, an oscillating element in the path of the fodder, and operative connections between the slide element and the oscillating element.

12. In a fodder cutter, the combination of a cutting mechanism, a feed mechanism, an intervening transmission gearing, a controlling gearing for the transmission gearing, and a trip mechanism for the controlling gearing including a trip device, a cam crank having radial jaws forming an intervening mouth, a spring acting to alternately rotate the cam crank in opposite directions from a neutral line, a slide element having a pin adapted to operate in the mouth and to alternately impinge the respective jaws, one of the jaws being operatively connected with the trip device, an oscillating element in the path of the fodder, and operative connections between the slide element and the oscillating element, said connections having a spaced-top extensibility.

13. In a fodder cutter, the combination of a cutting mechanism, a feed mechanism, an intervening reversible and releasable transmission gearing, a controlling gearing for reversing the transmission gearing, an oscillating element in the path of the fodder, and a trip mechanism for the controlling gearing actuated by the oscillating element at a predetermined point in its oscillation.

14. In a fodder cutter, the combination of a cutting mechanism, a feed mechanism, an intervening reversible and releasable transmission gearing, a controlling gearing for reversing and releasing the transmission gearing, an oscillating element in the path of the fodder, and a trip mechanism for the controlling gearing actuated by the oscillating element at predetermined points in its oscillation.

JOSEPH DICK.

Witnesses:
  Philip A. H. Terrell,
  Ruth A. Miller.